Nov. 24, 1936.  J. B. GOLDSBOROUGH  2,062,264
SANITARY FERMENTATION AND DEHYDRATING APPARATUS
Filed Sept. 23, 1931  3 Sheets-Sheet 1

INVENTOR
John B. Goldsborough
BY
ATTORNEYS

INVENTOR
John B. Goldsborough
BY
ATTORNEYS

Nov. 24, 1936.   J. B. GOLDSBOROUGH   2,062,264
SANITARY FERMENTATION AND DEHYDRATING APPARATUS
Filed Sept. 23, 1931   3 Sheets-Sheet 3

INVENTOR
John B. Goldsborough
BY
ATTORNEYS

Patented Nov. 24, 1936

2,062,264

UNITED STATES PATENT OFFICE 2,062,264

SANITARY FERMENTATION AND DEHY-
DRATING APPARATUS

John B. Goldsborough, Croton-on-Hudson, N. Y.

Application September 23, 1931, Serial No. 564,519

20 Claims. (Cl. 195—142)

The present invention relates to a mode of and apparatus for converting organic matter, such as garbage and other refuse into humus-like matter suitable for use as a fertilizer, and includes the use of sanitary fermentation cells of a character which permits the avoidance of an accumulation of residue of previously treated substances, which residue becomes putrid causing the cells to become malodorous.

In some fermentation cells heretofore in use there were inaccessible cavities and spaces which could not be properly cleansed and became foul, as well as becoming the abode of multitudinous maggots which could not be eradicated. Cells of this type have within a comparatively short time emitted such objectionable odors as to cause vigorous complaints from people situated close enough to them to be constantly offended thereby. It is an object of the present invention to so form fermentation cells that they may be easily and thoroughly cleansed as often as is necessary to maintain them in a sanitary condition.

A further object is to so construct the individual cells that water, due to the condensation of rising vapors from material being subjected to a fermenting and dehydrating treatment, is controlled so that it will not fall back upon such material and render it soggy. This avoids the rotting of the material, and, taken in conjunction with the maintenance of the sanitary condition of the cell or cells already referred to, prevents the emission of obnoxious odors.

It is also proposed to provide the fermentation cells with means for loading the cells with material to be treated, so that the material is arranged in tiers of separated deposits, whereby there is an avoidance of a single unduly large and compact mass of material. This is highly desirable since the individual deposits of material may be readily restricted to volumes that respond fully to the fermenting and dehydrating processes to which they are subjected. Further promotion of these processes is attained by maintaining adequate space about and between successive vertically disposed deposits. With this arrangement, the entire material with which the individual cells are charged completely receives the intended treatment, and there is no central core of soggy material that fails to respond thereto due to an excessive bulk of material, such as happens in some forms of cells wherein the material is dumped therein in a single mass of large proportions.

Regulation of the interior of the individual cells is had, whereby during a considerable period of the process while fermentation is taking place the cell interior is normally closed from the outside atmosphere. Temperature is thus developed from the bacteria in the deposits of the material propagating the bacteria and promoting the fermentation of the material. With the increase of the resultant temperature a gaseous pressure develops, and means are provided for causing the automatic escape of any excess thereof.

Additional regulation is provided, so that as the fermentation of the material in one cell reaches a point at which the temperature in the cell is at a maximum or begins to recede, that cell may be thrown into communication with an adjacent cell that has been newly charged with material for treatment, this adjacent cell having been closed to the outside atmosphere. The temperature of such adjacent cell is accordingly more rapidly raised by the influx of the heated gases from the cell in which the fermentation has advanced to the maximum point, thus hastening the fermentation in the newly charged cell.

Novel and effective means are provided for placing the cell in which the fermentation has reached a desired point into a controlled communication with the outside atmosphere to effect a dehydration of the material and to bring it into an ultimate condition in which it may be ground up to form an excellent fertilizer. In due course, each cell yields its final product, and the process is repeated in the individual cells ad infinitum.

Other features not already referred to but becoming manifest hereinafter are, of course, to be considered as being part of the present invention.

Figure 2:
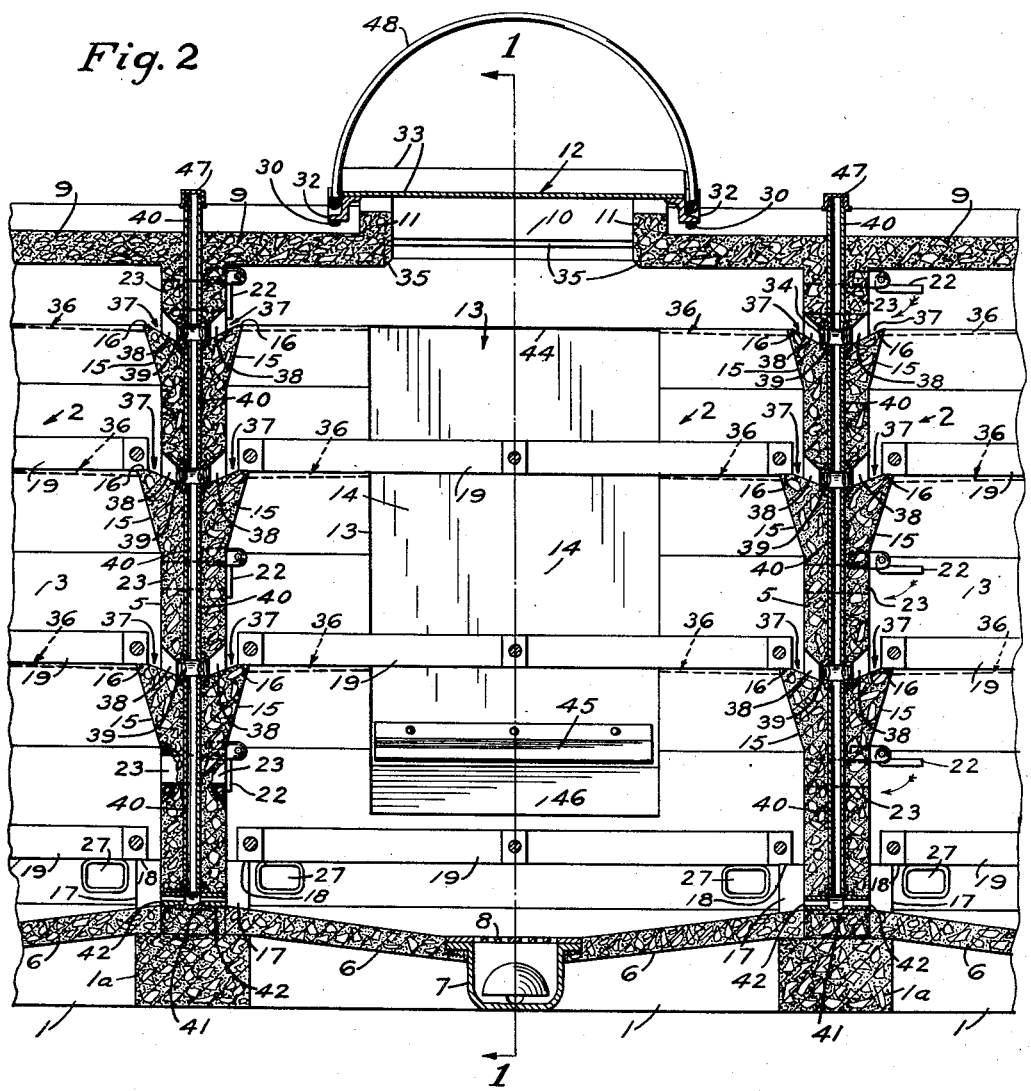
Fig. 2 is another vertical section taken substantially on the line 2—2 of Fig. 1, the material being omitted for the sake of clearness.

Referring now to the drawings, spaced parallel sills 1 extend longitudinally of a row of successive fermentation cells 2, as shown in Fig. 2, and transverse sills 1a lie between and connect the longitudinal sills at suitable intervals. Rising from one of the longitudinal sills 1 is a front wall 3, and extending upward from the other sill 1 is a rear wall 4. Transverse or side walls 5 rest on the transverse sills 1a, and each cell 2 is provided with a floor 6 that preferably overlies the sills and slopes slightly downward from the four sides of the cell to a drain receptacle 7 at the center of the floor, the receptacle being provided with a perforated top plate 8. Each cell 2 is provided with an anticlinal roof 9, and this roof may be common to the cells of the row. The sills, floors, walls and roofs are preferably of concrete, and are solid, except for certain openings or passages therein, which passages do not, however, change the solid character of the cell structure, as will become manifest hereinafter.

The roof of each cell is provided with an inlet opening 10 for the insertion into the cell of material to be treated the opening being surrounded by a curbing 11 that projects a little above the roof. A hatch 12, more fully described later on, is provided for each opening 10, and in the front wall 3 of each cell 2 is a door-way 13 that is normally closed by a suitable door 14.

In each cell the front, rear and side walls 3, 4 and 5, respectively, are flared outwardly at different levels, as indicated at 15, to form ledges 16. At the bottom of the cells, blocks 17 are moulded with the walls thereof and project inwardly to have top surfaces 18. On these top surfaces, and on the ledges 16, are mounted a plurality of grates 19 arranged to form a tier of grated platforms in each cell, there being a number, such as three, individual gates at each level, forming the platform thereat. Each grate 19 is displaceable from its usual position, and the grates of each platform may be piled one upon the other in any of a variety of locations, as is indicated, for example in dot and dash lines in the lower left hand portion of Fig. 1. This limits the occupancy of the interior of the cell by the grates to a relatively small portion of the volume of the cell, whereby the greater part of the cell may be unoccupied at certain times, for reasons given later on.

Figure 1:
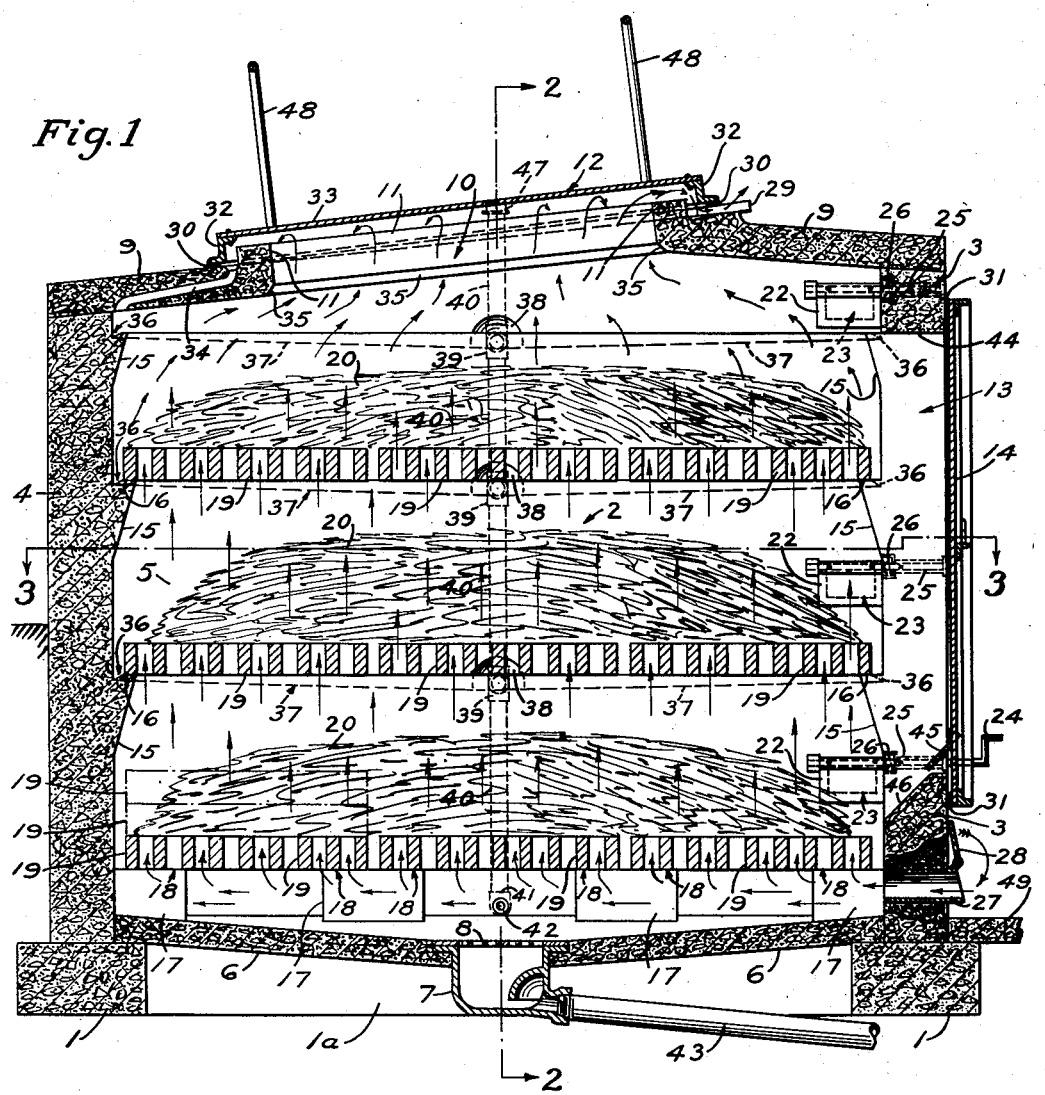
Fig. 1 is a vertical section taken on the line 1—1 of Fig. 2, and shows one of the improved fermentation cells fully charged with material for treatment, the cell being regulated for the dehydration of the material.

If the grates 19 of the two upper platforms are respectively stacked in this manner at the two upper levels of support for these platforms, and the grates of the lowest level are in their normal platform-establishing positions shown in full lines in Fig. 1, material 20, such as garbage, may be dumped through the inlet opening 10 in the roof 9 of one of the cells to fall upon the lowermost platform of grates, which under these conditions, would be substantially co-extensive with horizontal cross sectional area of interior of the cell. The door 14 in the front wall 3 of the cell may be opened, and the garbage be properly and loosely distributed over the grates of the lowest platform by an attendant, and also be kept from being piled too high thereupon.

Thereafter the grates 19 for the next higher level may then be positioned as shown in Fig. 1 to form another, but higher, grate platform that is substantially co-extensive with the horizontal area of the interior of the cell. Another deposit of garbage 20 may be entered through the roof opening 10 to fall upon the platform at the second level of grates, and the garbage may be loosely distributed and its height regulated by the attendant, as before. This may be followed by a similar arranging of the grates 19 for the platform at the highest level, and the depositing and distribution of garbage 20 thereon. The hatch 12 will then be put into position fully closing the opening 10, and the door 14 will be closed, and fastened by a lock 21 shown in Fig. 3, the end of the lock entering an aperture in one of the angle bars that form an outlining frame for the door.

Figure 3:
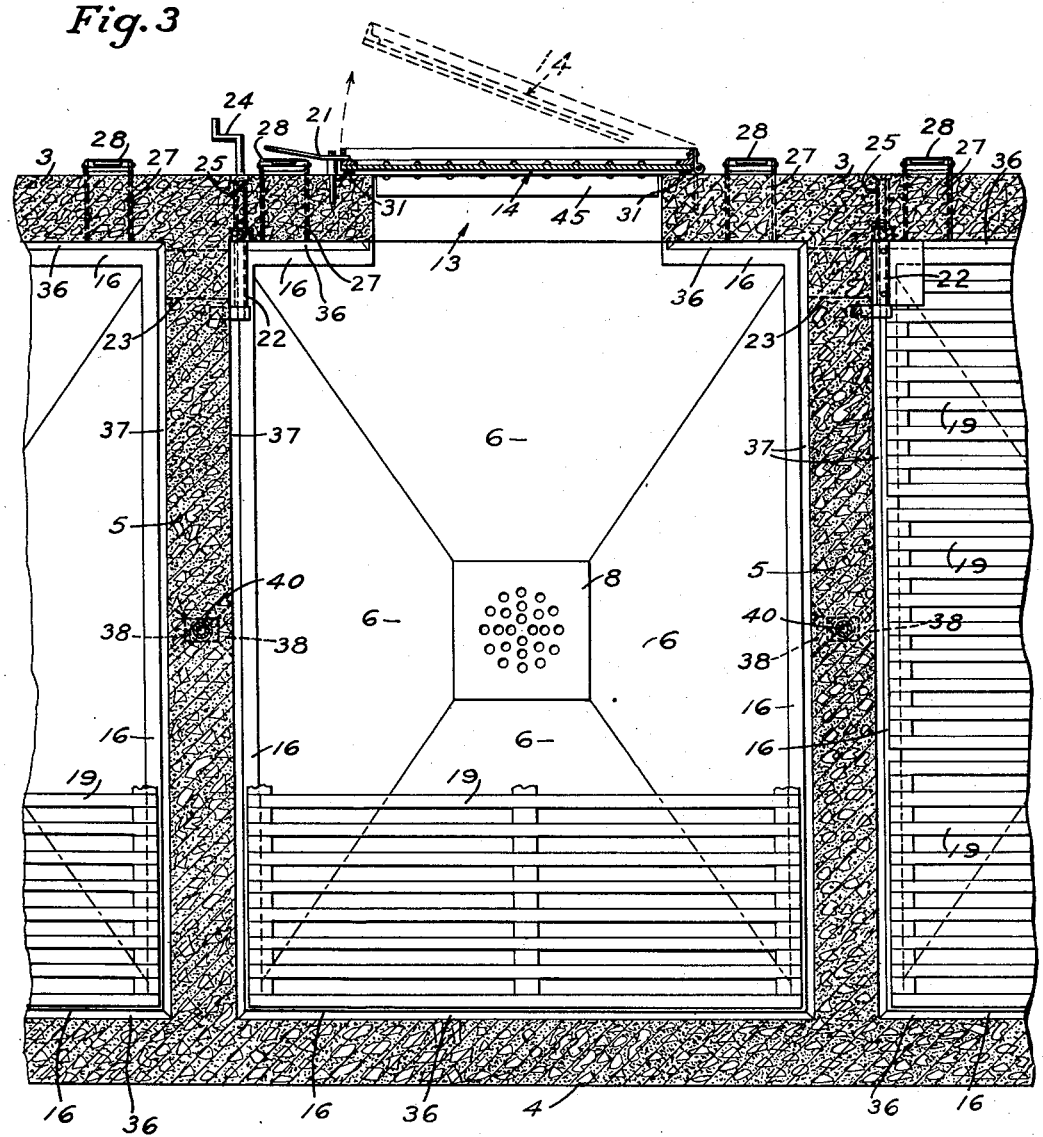
Fig. 3 is a horizontal section taken on the line 3—3 of Fig. 1.

In addition hinged gates 22 will also be moved to lie against the vertical side walls 5 of the cell to close passages 23 that extend through these walls and connect the interior of the cell with the inside of the next adjacent cells. To move the gates 22 a crank 24 is employed, and is inserted successively into the tubes or passages 25 in the front wall 3 of the loaded cell 2, as shown in Figs. 1 and 3. In each instance, the stem of the crank 24 is thrust into the tube 25 until it engages the pintle of the gate 22, whereupon the crank is turned to swing the gate in the desired direction. Any suitable means, as a spring 26, may be used to press against the gate 22 and tend to maintain it in the position in which it is placed. All of the transverse walls 5, except the end walls (not shown), of the row of cells are provided with the intercommunicating passages 23, and the gates 22 therefor are disposed on one side of each of these intermediate transverse walls. Accordingly, the gates 22 controlling the passages 23 in both of the side walls of the cell that has been described as having been fully loaded will be in passage-closing positions.

Furthermore, each cell 2 is provided in the bottom portion of its front wall 3 with air inlet conduits 27, leading from the external atmosphere to the interior of the cell, as shown to advantage in Figs. 1 and 2. The outer ends of the air inlet conduits 27 have gates 28 hinged thereto, and when the cell has been fully loaded, as described, the gates 28 of that cell will, at first also be in position to close the air inlet conduits 27 of such cell.

Under these conditions, the hatch 12 of the newly loaded cell 2 will be closed, and not be partially raised by the wedge 29, as shown in Fig. 1. Consequently, a gasket 30 that is wired or otherwise secured to the bottom flange of the hatch 12 will lie on the top surface of the roof 9 of the cell, and seal the opening 10 therethrough. The door 14 in the front wall 3 of the cell 2 is provided with a gasket 31 similarly secured to the door. Hence, the newly loaded cell is completely closed and sealed against the external atmosphere and maintained out of communication with the cells adjacent to it.

Due to the propogation of the bacteria in the garbage 20, or other material, the temperature in the sealed cell rises, and the fermentation of the material progresses. Should the temperature become sufficiently high to expand the gases emanating from the garbage so as to develop excessive gaseous pressure, such pressure will lift the hatch 12, allowing the escape of enough of the gases to permit the hatch to settle back into its opening-closing position. Thus, there is an automatic regulation of the pressure, and the temperature is maintained confined in the cell, where it reaches a maximum height, say, of approximately 150° Fahrenheit. The cell is kept closed as described for a suitable period, as, for example, for about five days.

During this period, moisture will accumulate in the interior of the cell, and it is important to keep the water resulting from its condensation from dripping or flowing back upon the garbage or other material under treatment to prevent it from rotting. As contributory to this end, the hatch 12 may be constructed in any of a variety of ways which will give it a certain predetermined relation to the roof structure and the opening therein. This relationship is well disclosed in Fig. 1, wherein the sides of the hatch 12 are shown to be composed of Z-bars 32 forming a rectangular frame, which when the hatch is in position surrounds the upwardly extending curbing 11 that extends about the roof-opening 10. Each of the Z-bars 32 of the frame is spaced away from the side of the curbing 11 which it parallels, and the bottom flanges of the Z-bars extend outwardly and have the gasket 30 secured to their under sides. The upper flanges of the Z-bars 32 are inwardly directed, and mounted on the upper surfaces thereof are the marginal edges of a sheet metal cover plate 33 that is of a size adequate to more than cover the roof opening 10. The height of the Z-bars 32 is enough greater than that of the curbing 11 to prevent the cover plate 33 from ever contacting with the top of the curbing 11.

By preference, the roof opening 10, its curbing 11 and the hatch 12, when the latter is in place, are all located on one of the slopes of the anticlinal roof 9. Accordingly, when moisture accumulates on the underside of the cover plate 33 sufficiently to flow under the influence of gravity, it runs to the lower side of the plate 33, down the adjacent side of the adjacent Z-bar 32 to pass through a bent passage 34 in the concrete roof 9, from which passage the fluid escapes to the exterior of the cell, as presently explained.

Moisture also collects on the curbing 11 and runs down the walls of the throat thereof, the bottom of such walls being curved or chamfered, as at 35, so that this moisture will be influenced to flow to and along the reversely inclined underside of the roof 9. In so flowing, the fluid or water reaches the vertical surfaces of the front and back walls 3 and 4, respectively, of the cell, and, as may be comprehended from Fig. 1, runs down these wall surfaces into gutters 36 formed by the vertical surfaces of these walls and the downwardly inclined tops of the flaring portions 15 of these same walls 3 and 4. The previously referred to bent passage 34 leads to the inner surface of the back wall 4 to discharge the fluid passing through the passage upon this wall, so that such fluid also runs into the adjacent gutter 36.

The gutters 36 drain the water into other gutters 37, shown in Figs. 1, 2 and 3, which gutters extend along the upper portions of the transverse walls 5, the bottoms of the gutters 37 sloping slightly downward to the central portions of the walls 5, where the gutters 37 empty into inclined recesses 38 in the transverse walls 5. The recess 38 in each side wall 5 leads to one side of a four-way fitting 39, into the top and bottom of which vertical pipes 40 are screwed, there being other fittings 39 and pipes 40 imbedded in each of the transverse walls 5 and combined with each other and with the first mentioned fittings and pipes to form a central vertical pipe-line or conduit extending from the top to substantially the bottom of each transverse wall 5, as clearly shown in Fig. 2. In this view, it is seen that a recess 38 leads from each of the adjacent cells 2 to each of the four-way fittings 39 of the single vertical pipe-line in each of the transverse walls 5. The bottom of the lowest pipe section 40 of each pipe-line is screwed into a T-fitting 41, short horizontal pipes 42 being screwed thereinto and leading to the floors 6 of adjacent cells 2.

Accordingly the water that is led to the recesses 38 near the top of the walls 5, as already explained, enters the four-way fittings 39 at the inner ends of these recesses, and flows down through the pipe-lines that are each composed of the fittings 39 and pipe sections 40 to pass out through the T-fittings 41 and short horizontal pipes 42 onto the floor 6 of the cells. Thereafter, the accumulated water flows along the sloping floor 6 of the cell it enters, to and through the perforated top plate 8 and into the drain receptacle 7. From here the water is discharged through an outlet pipe 43 to a sewer, or some other external means of liquid disposal.

Other gutters 36 and 37 are present at lower levels, as shown in Figs. 1 and 2 and convey water accumulated from the condensation on the sides of the transverse walls 5 below the uppermost platform of grates to other recesses 38, and therefrom to the respective vertical pipe-lines 39—40 and to the cell floor 6, whereby this additional water is carried to the drain receptacle 7 of the cell and out through the pipe 43. Below the lowermost gutters 36 and 37 the water of condensation runs directly down all of the side walls of the cell 2 to the floors 6 and to the drain receptacle 7, and hence out of the cell.

At the doorway 13 the water of condensation consolidates in the well-known manner on the under surface 44 at the top of the doorway 13 from whence it finds its way to the sheet metal door 14. The water then drains down on the inside surface of the sheet metal door 14 from which it is carried by a downwardly inclined deflecting plate 45 rigidly mounted thereon to extend inwardly therefrom at an angle thereto. The deflection plate 45 conveys the water of condensation to a shedding surface 46 in the bottom of the doorway 13 from whence the water drains down the inside surface of the front wall 3 of the cell to the floor 6 thereof and to the drain receptacle 7, being there discharged through the outlet pipe 43.

As previously stated, during the temperature-developing period of the fermentation process the loaded cell 2 is sealed against the admission of the external atmosphere, and that such sealing may be complete caps 47 are screwed onto the upper ends of the highest pipes 40 of the vertical pipe lines 39—40 that are embedded in the transverse walls 5 of the cells 2.

Figure 4:
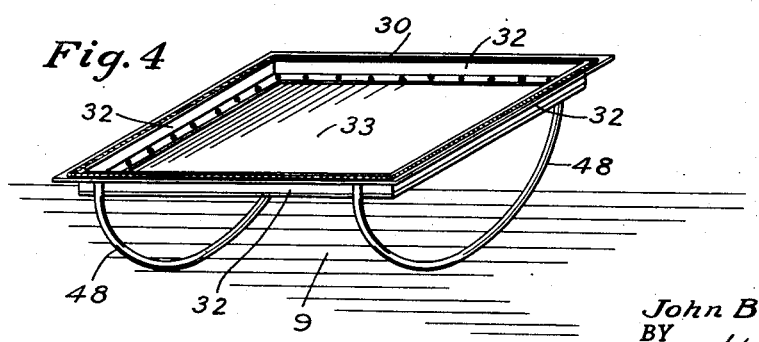
Fig. 4 is a perspective view of the hatch for one of the cells as it has been rolled into an inverted position, such as it may occupy when removed from the material inlet opening.

To promote the ease of removing and replacing the hatch 12 of each cell 2, semi-circular bails 48 are rigidly secured to the frame of each hatch. When the hatch is to be removed to permit the depositing of garbage or other substance in the cell, the bails 48 are grasped by an attendant and the hatch is picked up and set to one side. By inverting the hatch when removing it, the hatch may be set down on the roof of the cell conveniently near the inlet opening 10 in the roof, and so as to rest on the bails 48, as shown in Fig. 4. After the cell has been loaded, the bail 48 may be grasped and the hatch 12 returned with an easy restoration to its normal position over the opening 10 in the roof where it will extend over the curbing 11 and seal the inlet to the cell without especial care on the part of the attendant.

After the usual period of maintaining the cell 2 sealed, while the fermentation of the garbage develops the maximum temperature therein, the cell is opened to the outside atmosphere and the ultimate dehydration of the garbage is effected. To accomplish this the gates 28 of the air inlet conduits 27 will be thrown to the position shown in Fig. 1, and the wedge 29 will be placed under the bottom of the Z-bar 32 that is at one side of the hatch 12. Thereupon the external air will flow through the plurality of air inlet conduits 27 in the bottom of the cell 2. The lowermost deposit of garbage 12 will act as a semi-baffle to cause the air currents to spread beneath it throughout the area of its bottom surface.

Inasmuch as the deposit of garbage on the lower platform of grates 19 is well and loosely distributed over the latter, and the garbage deposits on the successively higher grate platforms are similarly spread, with ample space between the tops of the garbage deposits and the next highest platform, and between the highest garbage deposit and the roof, the air currents percolate thoroughly through and about the garbage deposits, effecting an efficient dehydration thereof, the air finally escaping from the cell 2 through the space between the now tilted hatch 12 and the roof 9. With the cell in this condition, the dehydrating process continues for a suitable period, say about two weeks.

When the dehydration of the garbage 20 is completed, the lock 21 is released and the door 14 is opened, after which the resultant product obtained is drawn out onto exterior floor 49 in front of the wall 3. This product may then be carried away and ground up for use as a fertilizer.

Successively adjacent cells will one after the other, or in groups yield similar products, and as each cell does so, it is ready to repeat the treatment of more garbage, but is first thoroughly cleansed. With the hatch 12 removed, or with the door 14 open, or with both of these conditions existing, the entire interior of the cell 2 may be completely washed with the aid of one or more lines of hose. The grates 19 of each platform may be suitably displaced to insure the effectiveness of the cleansing. The nozzle of a hose may be inserted into each of the recesses 38 in the transverse walls 5 to not only flush and clean it, but also the interior of the fitting 39 located at its inner end. Also the caps 47 at the tops of the vertical pipe lines 39—40 may be removed and a hose nozzle inserted into the top pipe section 40, whereby the entire length of each pipe-line may be flushed and washed out throughout its entire length, the water running out through the short horizontal pipes 42 at the bottom thereof. The passages 23 may also be washed out, and the gutters 36 and 37 will be swept clear of any residuum of water condensation as the interior of the walls is played upon by water from a hose. Every part of the cell is subject to thorough cleansing, and there are no inaccessible interior spaces or pockets wherein maggots or filth may remain. During the cleaning of all the parts of the interior of the cell, the cleansing water flows to the sloping floor 6 of the cell and into the drain receptacle 7, and is conveyed away by the discharge pipe 43. Accordingly, the cells may be kept in a sanitary condition, do not emit offensive odors and any tendency for maggots to accumulate therein is effectually prevented as all the walls and passages of the cells may be thoroughly washed after each fermentation cycle has taken place.

It will be seen that certain features of the present invention relate to improved embodiments of certain features disclosed in my co-pending application Serial No. 256,460, filed February 22, 1928.

While a preferred embodiment of the invention has been disclosed herein, it will be understood that it may be embodied in other forms and that various changes in its structural details may be made without departing from the principle of the invention as defined in the appended claims.

I claim:

1. In apparatus for converting organic matter, a fermentation cell, perforated supports for holding deposits of organic matter in separated alignment and in vertical arrangement, means adjustable to seal said cell or to induce air currents therethrough, and means for collecting moisture condensed above each of said supports and withdrawing it from the interior of the cell.

2. Apparatus for converting organic matter comprising a fermentation cell apertured for the entry and removal of organic matter, vertically spaced supports for holding the organic matter in considerably separated deposits and having provisions for draining moisture from the lower sides of said deposits, means for sealing said cell, and moisture collecting and draining means having parts individually associated with said supports for conveying moisture developed in the cell away from said deposits and out of said cell.

3. Apparatus for converting organic matter comprising a plurality of mutually intercommunicating fermentation cells each apertured for the entry and removal of organic matter, the individual cells having superimposed ventilated supports for holding organic matter in materially separated deposits, displaceable closures for the apertures of said cells, moisture collecting and draining means for the cells for conveying moisture therein away from said deposits, and communication governing means operable to selectively isolate individual cells or to place them into mutual communication.

4. Apparatus for converting organic matter comprising a fermentation cell having upstanding walls and apertured for the entry and removal of organic matter, mutually supplementing supports extending between said walls subdividing said cell, said supports being adapted to hold the organic matter in considerably separated deposits, and being displaceable to materially consolidate the interior space of said cell, means for sealing the cell, and moisture collecting and draining means for collecting moisture at the sides of the cell substantially at the levels of said supports and conveying it downwardly past said deposits.

5. In apparatus for converting organic matter, a fermentation cell having a sloping roof provided with an opening therethrough, and a displaceable cover inclined with the roof out of contact with the portion thereof that immediately surrounds the opening and in contact with the roof therebeyond, the underside of said cover being adapted to collect and drain moisture developed in the cell, said roof being provided with a passage for conveying liquid resulting from the drained moisture to a place of drainage removal.

6. In apparatus for converting organic matter, a fermentation cell having a sloping roof provided with an opening therethrough, a curbing at the opening projecting above the normal upper surface of the roof, and an inclined displaceable cover extending over said opening and curbing and beyond the latter in spaced relation thereto, said cover extending into engagement with said roof beyond the lower portion of said curbing, said roof being provided with a passage extending from the space between the lower portions of the curbing and the cover to a place of drainage egress to drain liquid resulting from moisture developing in the cell and travelling on the underside of said cover to said passage.

7. In apparatus for converting organic matter, a fermentation cell having a sloping roof provided with an opening therethrough and a wall structure having a liquid-draining channel in communication with the exterior of the cell, a displaceable cover adapted to be inclined with the roof and extending over said opening in maintained spaced relation to the portion of the roof that surrounds said opening, and a seal for interposition between said cover and roof, the roof being provided with a passage extending between the covered portion of the roof and the liquid-draining channel to convey to the exterior of the cell liquid resulting from moisture from the cell settling on and travelling along the underside of said cover.

8. In apparatus for converting organic matter, a structure having a roof with an opening therethrough, and a removable cover for said opening, said cover being provided with members secured thereto to serve as means for moving the cover bodily, said members having an arcuate formation enabling the cover to be rolled into a convenient out-of-use position.

9. In apparatus for converting organic matter, a cell comprising a sloping roof having an inclinatory underside for the collection and drainage of moisture, walls forming sides of the cell adapted to receive the interior drainage of the roof, the interior surfaces of said walls having means forming intercommunicating draining passages, and downwardly extending draining passage-forming means with which the first named passages communicate.

10. In apparatus for converting organic matter, a cell comprising walls forming the sides thereof and provided with gutters adapted to drain liquid from the sides of said walls, and conduit-forming means to which said gutters lead adapted to convey the liquid to a place of egress from the cell.

11. In apparatus for converting organic matter, a cell comprising walls forming the sides thereof, substantially horizontally disposed gutters extending along said walls at different levels, the gutters of meeting walls entering one into another, liquid-conveying conduits in the walls having the entered gutters in communication with the last named gutters and extending toward the bottom of the cell, a liquid-draining floor onto which said conduits are adapted to discharge liquid, and means for conveying the liquid from the floor to the exterior of said cell.

12. In apparatus for converting organic matter, a cell comprising walls forming the sides thereof, gutters and grate supports extending substantially horizontally along said walls at different levels, the gutters of meeting walls entering one into another, liquid-conveying conduits in communication with the entered gutters and extending downwardly of the walls having the last named gutters, a liquid-draining floor onto which said conduits are adapted to discharge the liquid, a liquid outlet in said floor, and grates mounted on said supports at different levels.

13. In apparatus for converting organic matter, a cell comprising walls forming the sides thereof, a roof having a moisture-draining underside and an opening therethrough, liquid-conveying means forming draining passages at different levels crosswise of said walls and also downwardly thereof, organic matter supporting platforms at different levels in said cell provided with air passages therein, air-admitting means in said cell below said platforms, a cover for said roof-opening, and means to maintain said air-admitting means and cover in air-admitting or excluding condition.

14. In apparatus for converting organic matter, a cell having a roof with a moisture-draining underside and a wall to which moisture drains from the underside of the roof, said wall having a doorway, a door for closing said doorway, said doorway having at its top a liquid-conveying under surface for leading liquid derived from the moisture to the door to flow downward thereon, a deflector on the lower part of the door for diverting the liquid therefrom, said doorway having a shedding surface in its bottom portion to direct the liquid to the lower part of the inside of said wall, and means to carry the liquid out of the cell.

15. In apparatus for converting organic matter, a cell having a wall, means forming liquid-draining channels at different levels on the wall, there being recesses in the wall for causing the liquid to flow into the wall, and a conduit extending downwardly through the wall and in communication with said recesses to receive the liquid therefrom, said downwardly extending conduit having a liquid outlet through the wall in the lower portion thereof.

16. In apparatus for converting organic matter, adjacent cells separated by a wall common thereto, a conduit extending downwardly through said wall and having an outlet near the bottom of the wall, and a closure for the upper end of said conduit, said wall having inlet passages in opposite sides thereof at different levels in the wall, the passages at each level being in communication with said conduit and with each other whereby they may be washed out throughout the thickness of the wall, and said closure being removable to permit the washing out of said conduit throughout its length.

17. In an apparatus for converting organic matter, a cell provided with walls having openings therethrough and inwardly projecting portions forming seats and gutters at successively higher levels, some of the gutters leading to others thereof for the removal of liquid resulting from moisture in the cell, means for draining the liquid from the last mentioned gutters to the exterior of the cell, sets of displaceable grates supported on said seats at different levels to form vertically separated platforms for supporting individual deposits of organic matter, certain of said openings being below said grates, and closures for said openings adapted to seal said cell and to be positioned to induce air currents from, through and to the exterior of said cell and through said grates and organic matter.

18. In apparatus for converting organic matter, adjacent cells having a wall therebetween provided with passages opening into the interiors of said cells, individual closures for said passages operable to place the interiors into and out of communication with each other, and means for controlling said closures.

19. In apparatus for converting organic matter, a plurality of walls forming successively arranged cells there being a wall between adjacent cells provided with passages therethrough connecting the interiors of adjacent cells, individual closures for the individual passages operable to place next adjacent cells into and out of communication with each other, there being separate means of access from the exterior of said cells to said closures, and actuating means adapted to be entered into different means of access to control said closures individually.

20. The method of converting organic matter comprising sealing organic matter in confined air in relatively loose superimposed and separated masses, maintaining such joint confinement of air and matter during the development by the latter of a relatively high temperature, separately jointly sealing confined air and other masses of organic matter in a similar manner, introducing the first confined air after it has become heated into the subsequently confined air, and sequentially causing currents of external air to flow through the first and second sealed masses of organic matter until they have become dehydrated.

JOHN B. GOLDSBOROUGH.